United States Patent
Suzumura et al.

(10) Patent No.: US 9,180,798 B2
(45) Date of Patent: Nov. 10, 2015

(54) VEHICLE LOCK

(75) Inventors: Hirokazu Suzumura, Aichi-gun (JP); Kazuya Iwasa, Obu (JP); Haruo Kato, Anjo (JP); Nobuyoshi Teraoka, Obu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 69 days.

(21) Appl. No.: 14/001,538

(22) PCT Filed: Feb. 24, 2012

(86) PCT No.: PCT/JP2012/054543
§ 371 (c)(1),
(2), (4) Date: Aug. 26, 2013

(87) PCT Pub. No.: WO2012/117958
PCT Pub. Date: Sep. 7, 2012

(65) Prior Publication Data
US 2013/0328372 A1 Dec. 12, 2013

(30) Foreign Application Priority Data
Feb. 28, 2011 (JP) ................... 2011-042840

(51) Int. Cl.
*E05C 3/16* (2006.01)
*B60N 2/20* (2006.01)
(Continued)

(52) U.S. Cl.
CPC *B60N 2/20* (2013.01); *B60N 2/366* (2013.01); *E05B 85/26* (2013.01); *B60N 2205/20* (2013.01)

(58) Field of Classification Search
CPC ............ E05C 3/16; E05C 3/167; E05C 3/22; E05C 3/24; E05C 3/26; E05C 3/30; E05C 3/40; B60N 2/015; B60N 2/01516; B60N 2/22; B60N 2/2245; B60N 2/3011; B60N 2/3013

USPC .......... 292/198, 216, DIG. 23, 44, 45, 47, 48, 292/53, 56, 213, 214, DIG. 43, DIG. 14; 296/65.01, 65.03, 65.05, 65.06; 297/336, 378.12, 378.13, 378.14; 403/322.1, 322.3, 325, 326, 327, 328, 403/330

See application file for complete search history.

(56) References Cited

U.S. PATENT DOCUMENTS 5,273,325 A * 12/1993 Zimmermann ............... 292/216
5,730,480 A 3/1998 Takamura
(Continued)

FOREIGN PATENT DOCUMENTS

EP 0 989 264 A1 3/2000
JP 8 218711 8/1996
(Continued)

OTHER PUBLICATIONS

International Search Report issued Apr. 17, 2012 in PCT/JP12/054543 Filed Feb. 24, 2012.
(Continued)

Primary Examiner — Alyson M Merlino
(74) Attorney, Agent, or Firm — Oblon, McClelland, Maier & Neustadt, L.L.P.

(57) ABSTRACT

The present invention provides a lock device for locking by inserting a striker into a base member. The lock device includes a latch, which is disposed on the base member and constrains and releases the striker, and a pawl, which holds the latch. Backlash of the latch is limited by a simple structure. A cam member is rotationally connected to the base member by a rotation shaft different from that of the pawl. An engaging protrusion and recess are formed on the pawl and cam member, respectively. When the pawl is at an allowable position, the protrusion and recess are engaged with each other to hold the cam member. The engagement is released when the pawl rotates to a holding position, engaging the cam member with the latch, which is at a locked position, thereby rotating the latch such that the striker contacts the bottom surface of a base groove.

7 Claims, 5 Drawing Sheets

(51) Int. Cl.
    *B60N 2/36*     (2006.01)
    *E05B 85/26*     (2014.01)
    *B60N 2/02*     (2006.01)

(56) References Cited

U.S. PATENT DOCUMENTS

| | | | |
|---|---|---|---|
| 6,267,420 B1* | 7/2001 | Miyagawa | 292/216 |
| 6,715,841 B2 | 4/2004 | Christoffel et al. | |
| 7,152,926 B2 | 12/2006 | Wrobel | |
| 7,243,974 B2 | 7/2007 | Kondo et al. | |
| 7,357,436 B2* | 4/2008 | Willing et al. | 296/65.03 |
| 7,740,317 B2* | 6/2010 | Yamada et al. | 297/378.13 |
| 7,914,062 B2 | 3/2011 | Iwasa et al. | |
| 8,882,160 B2* | 11/2014 | Kamata et al. | 292/216 |
| 2005/0082865 A1* | 4/2005 | Doxey et al. | 296/65.16 |
| 2005/0184549 A1* | 8/2005 | Robinson et al. | 296/65.03 |
| 2006/0170270 A1 | 8/2006 | Inoue et al. | |
| 2006/0208505 A1 | 9/2006 | Christoffel et al. | |
| 2007/0080554 A1 | 4/2007 | Willing et al. | |
| 2009/0145183 A1 | 6/2009 | Maeta et al. | |
| 2010/0032967 A1* | 2/2010 | Otsuka | 292/240 |
| 2010/0143029 A1* | 6/2010 | Omori | 403/322.4 |
| 2012/0301212 A1* | 11/2012 | Champ et al. | 403/27 |

FOREIGN PATENT DOCUMENTS

| | | |
|---|---|---|
| JP | 2005 96530 | 4/2005 |
| JP | 2005 263109 | 9/2005 |
| JP | 2005 271903 | 10/2005 |
| JP | 2006 248330 | 9/2006 |
| JP | 2008 114690 | 5/2008 |
| JP | 2009 057039 | 3/2009 |
| WO | WO 2007037004 A1 * | 4/2007 |

OTHER PUBLICATIONS

International Preliminary Report on Patentability and Written Opinion of the International Searching Authority issued Sep. 3, 2013 in PCT/JP2012/054543 (submitting English translation only).
Extended European Search Report issued in Application No. EP 12 75 1729 on May 7, 2015.

* cited by examiner

VEHICLE LOCK

FIELD OF THE INVENTION

The present invention relates to a vehicle lock device.

BACKGROUND OF THE INVENTION

Conventionally, as a vehicle lock device, for example, a vehicle seat lock device as disclosed in Patent Document 1 is known. The lock device includes a base member including a base groove, into which a striker can be inserted, and a latch including a latch groove that can be engaged with and disengaged from the striker. The base groove and the latch groove restrain the striker, and a pawl restricts the rotation of the latch so that the locked state of the striker is maintained. In the locked state, a protrusion formed on the latch is pressed by a cam member according to the urging force of a spring so that the latch is rotated (urged) in the locking direction to reduce the backlash of the latch in the locked state.

The latch and the pawl are supported on the base member via different rotation shafts and arranged in the same plane perpendicular to the rotation shafts. Also, the pawl and the cam member are coaxial and stacked in the axial direction.

When the latch in the locked state receives a major load in the releasing direction (unlocking direction), the pawl sustains the load. The cam member reduces the backlash in the locked state by the urging force of the spring. As mentioned above, the functions of the pawl and the cam member are clearly distinguished. For example, even if the function of the cam member is impaired, the function of the pawl, i.e., the function of maintaining the locked state, is guaranteed. That is, when a major load is applied to the latch, the cam member is not configured to sustain the load.

Accordingly, in the configuration in which the pawl and the cam member are coaxially arranged, it is necessary to ensure the range of rotation of the pawl, i.e., the range of the engagement of the pawl with the latch basically in accordance with the range of rotation of the cam member, which is rotated together with the pawl. Therefore, the amount of rotation of the pawl at the time of unlocking is increased. Thereby, the amount of operation of a control lever associated with the unlocking operation is increased as well so that manipulability and appearance are impaired.

Accordingly, for example, in the vehicle seat lock device disclosed in Patent Document 2, the pawl and the cam member are supported on the base member via different rotation shafts, and the pawl and the cam member are linked by a linkage. Thereby, it is assumed that the ranges of the rotations of the pawl and the cam member are independent from each other, or the timing of locking and unlocking (releasing) by the pawl and the cam member is arbitrarily adjusted.

PRIOR ART DOCUMENT

Patent Document

Patent Document 1: Japanese Laid-Open Patent Publication No. 2005-271903
Patent Document 2: Japanese Laid-Open Patent Publication No. 2009-57039

SUMMARY OF THE INVENTION

In the lock device of Patent Document 2, however, it is necessary to provide a link separately to link the pawl and the cam member with each other, which inevitably increases the number of components. As the number of components is increased, the likelihood of assembling error is increased. Accordingly, the number of assembling steps is likely to be increased to ensure accuracy as the entire device.

An object of the present invention is to provide a vehicle lock device that limits the increase of the number of components to reduce the likelihood of assembling error.

To achieve the above described object, according to an aspect of the present invention, a vehicle lock device includes: a base member configured to be fixed to one of a fixing member and a moveable member; a latch having a latch groove; a pawl; a cam member; an engaging protrusion formed on one of the pawl and the cam member; and an engaging recess formed in the other one of the pawl and the cam member. The base member has a base groove into which a striker that is connected to the other one of the fixed member and the moveable member is inserted. The base groove includes a bottom surface. The latch groove is capable of being engaged with and disengaged from the striker. The latch is rotationally coupled to the base member, and the latch can rotate between a locked position, in which the latch restrains the striker while the striker is between the latch and the base groove, and an unlocked position, in which the latch releases striker. The pawl is rotationally coupled to the base member by a rotation shaft and is rotational between an allowable position and a holding position. In the allowable position, the pawl allows the latch to rotate between the locked position and the unlocked position, and at the holding position, the pawl prevents rotation of the latch from the locked position to the unlocked position, and the pawl rotates from the holding position to the allowable position according to an unlocking operation. The cam member is rotationally coupled to the base member by a rotation shaft that is different from the rotation shaft of the pawl. The cam member allows the latch to rotate between the locked position and the unlocked position and is engaged with the latch at the locked position to rotate the latch such that the striker contacts the bottom surface of the base groove. The engaging recess is engaged with the engaging protrusion to hold the cam member when the pawl is located at the allowable position, and the engaging recess is disengaged from the engaging protrusion to release the cam member from the pawl when the pawl rotates between the allowable position and the holding position.

EFFECTS OF THE INVENTION

According to the present invention, a vehicle lock device that controls the increase of the number of components to reduce the likelihood of assembling error is provided.

DETAILED DESCRIPTION OF THE PREFERRED EMBODIMENTS

With reference to FIGS. 1 to 6, a vehicle seat lock device according to an embodiment of the present invention will be described. The device is mounted on a rear seat of a vehicle such as an automobile.

Figure 6:
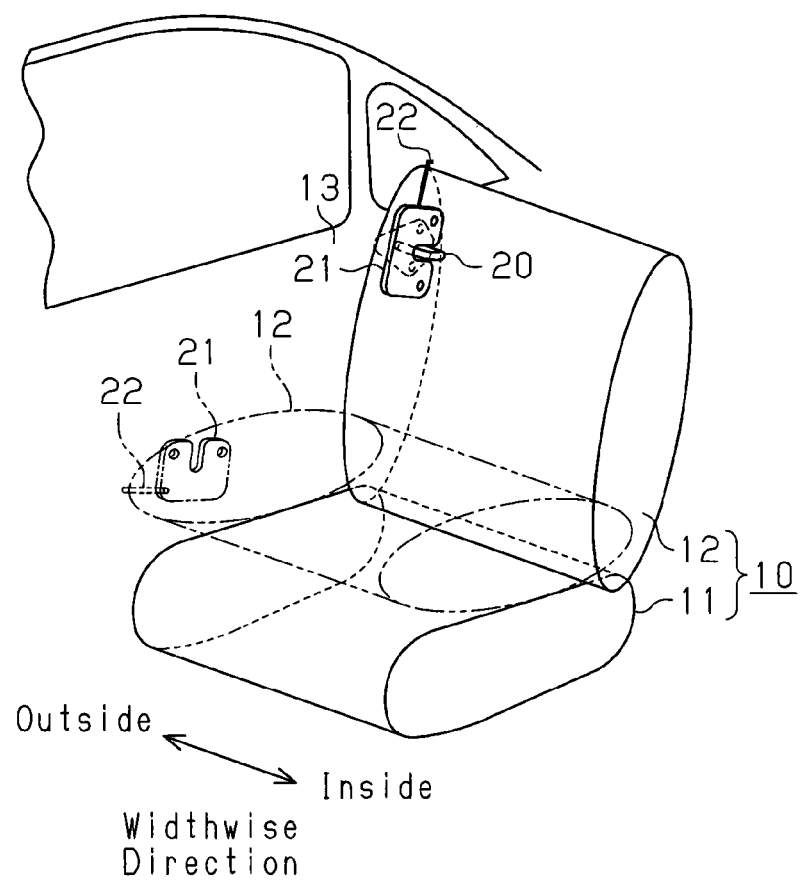
FIG. 6 is a perspective view illustrating a rear seat.

As shown in FIG. 6, a rear seat 10 includes a seat cushion 11 forming a seat portion of an occupant, and a seat back 12 as a moveable member arranged at the rear end of the seat cushion 11. The seat back 12 is supported at the lower end thereof in a tiltable manner in the front-back direction. A lock body 21 is formed on an outer surface of the seat back 12 in the lateral direction. A substantially U-shaped striker 20 formed by a metal bar, for example, is fixed on an inner surface of a vehicle body 13 as a fixing member. In the state where the seat back 12 stands rearward (shown by solid lines), the striker 20 is located on the inner surface of the vehicle body 13 such that the striker 20 faces the lock body 21 in the lateral direction. An end of a bar control lever 22 as an operation member is exposed to the outside of the seat back 12. The other end of the control lever 22 is linked with the lock body 21.

In the state where the seat back 12 stands rearward, the striker 20 and the lock body 21 are engaged with each other to maintain the orientation of the seat back 12. When the control lever 22 is pulled, the engagement between the striker 20 and the lock body 21 is cancelled so that the seat back 12 is tiltable forward with respect to the seat cushion 11 (shown by broken lines in which a long dash alternates with a pair of short dashes).

Figure 1:
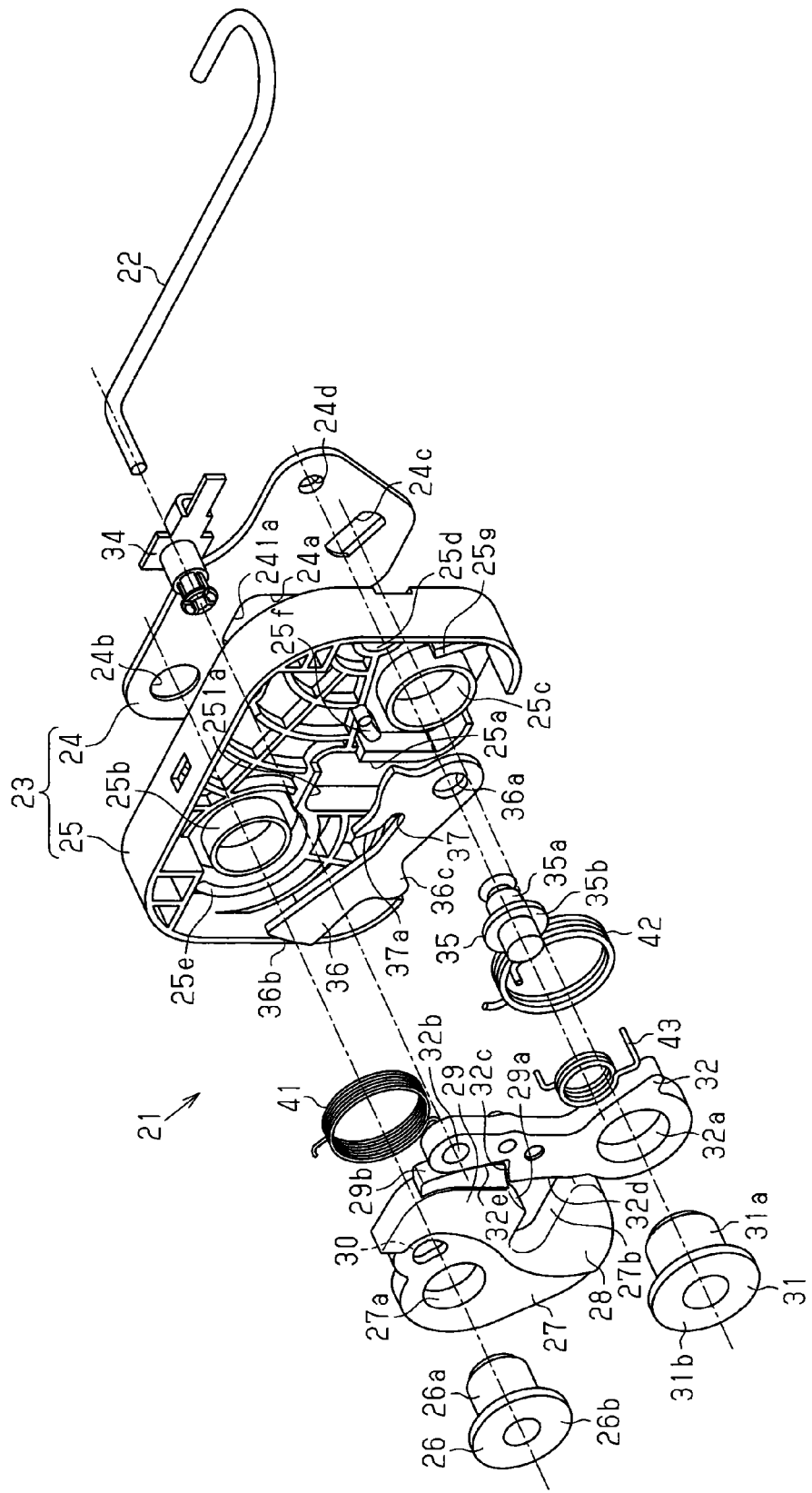
FIG. 1 is an exploded perspective view illustrating one embodiment of the present invention.

Next, the lock body 21 will be further described. As shown in FIG. 1, the lock body 21 includes a base member 23 forming a casing. The base member 23 is configured to be fixed to the seat back 12. The base member 23 is provided with a base plate 24 formed of a metal plate, for example, and a substantially box-shaped base housing 25 formed of a plastic material, for example. The base housing 25 is stacked on the base plate 24 in the plate thickness direction. The base plate 24 and the base housing 25 are formed to be substantially C-shaped, and respectively have substantially U-shaped base grooves 24a and 25a. The grooves 24a and 25a open to face the striker 20 on a moving track when raising the seat back 12 backward. Accordingly, the striker 20 is inserted into the base grooves 24a and 25a by raising the seat back 12 backward. In contrast, the striker 20 is released from the base grooves 24a and 25a by folding the seat back 12 forward. Recessed end surfaces, which are the deepest portions of the base grooves 24a and 25a, correspond to bottom surfaces 241a and 251a, which contact the striker 20.

Figure 2:
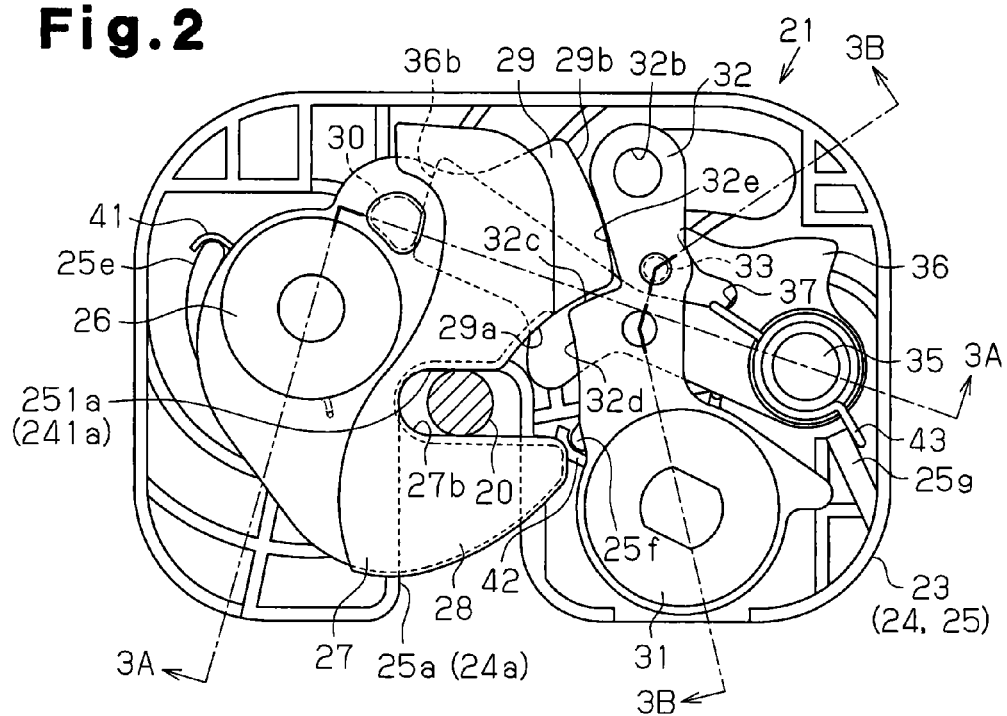
FIG. 2 is a side view illustrating the present embodiment.

A circular fixing hole 24b is formed in the base plate 24 at a position above and left of the base groove 24a in FIG. 1. Further, a substantially rectangular fixing hole 24c is formed in the base plate 24 at a position opposite to the fixing hole 24b across the base groove 24a. Moreover, a circular fixing hole 24d is formed in the base plate 24 at a position above and right of the fixing hole 24c. In contrast, a cylindrical boss 25b is formed in the opening side of the base housing 25 such that the boss 25b protrudes coaxially with the fixing hole 24b. Further, a cylindrical boss 25c is formed in the opening side of the base housing 25 in the same manner such that the boss 25c protrudes coaxially with a central axis of the fixing hole 24c. Moreover, a cylindrical boss 25d is formed in the opening side of the base housing 25 in the same manner such that the boss 25d protrudes coaxially with the fixing hole 24d. Furthermore, as shown in FIG. 2 as well, a substantially arcuate wall-shaped spring holding portion 25e is formed in the base housing 25. The spring holding portion 25e is coaxial with the boss 25b and located on the left of the boss 25b in FIG. 2. A substantially arcuate wall-shaped spring holding portion 25f is formed in the base housing 25. The spring holding portion 25f is coaxial with the boss 25c and located above and on the left of the boss 25c. A post-shaped spring holding portion 25g, which extends in a radial direction of the boss 25d below the boss 25d, is formed in the base housing 25.

Figure 3A:
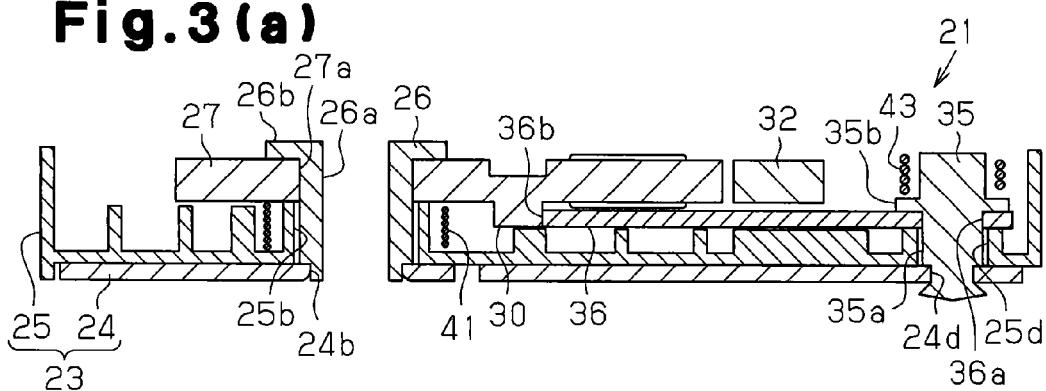
FIG. 3(a) is a cross-sectional view taken along line 3A-3A of FIG. 2.

A latch 27 formed of a plate material is rotationally coupled with the base member 23 by a latch bushing 26 mounted on the boss 25b. That is, as shown in FIG. 3(a), the latch bushing 26 has a substantially cylindrical support portion 26a, which is press-fit into the boss 25b and fixed into the fixing hole 24b at the tip end thereof. Also, the latch bushing 26 has a flange 26b that extends outward in the radial direction at the proximal end of the support portion 26a positioned apart from the base plate 24. In contrast, a circular through hole 27a with an inner diameter the same as the outer diameter of the support portion 26a is formed in the latch 27. The latch 27 is rotationally supported around the support portion 26a to be inserted into the through hole 27a in the state where the movement thereof in the axial direction is limited between a distal end surface of the boss 25b and the flange 26b.

As shown in FIGS. 1 and 2, the latch 27 is substantially C-shaped, and has a substantially U-shaped latch groove 27b, which is recessed toward a central portion of the latch 27 in the vicinity of the base grooves 24a and 25a. The opening width of the latch groove 27b is set slightly greater than the diameter of the striker 20. The latch 27 has a substantially claw-shaped first engaging portion 28 on opening sides of the base grooves 24a and 25a with respect to the latch groove 27b (below the latch groove 27b in FIG. 2). The latch 27 has a substantially trapezoidal second engaging portion 29 opposite to the openings of the base grooves 24a and 25a (above the latch groove 27b as viewed in FIG. 2, i.e., at a position where the bottom surfaces 241a and 251a are located). An end surface of the second engaging portion 29 continuous to the latch groove 27b forms a first latch engaging surface 29a with a substantially arcuate surface having a recessed central portion. Also, the end surface of the second engaging portion 29 continuous to the first latch engaging surface 29a forms a second latch engaging surface 29b with a substantially arcuate surface about the latch bushing 26 (through hole 27a) as a center. A latch holding protrusion 30 is formed on the second engaging portion 29 at an intermediate portion between the through hole 27a and the second latch engaging surface 29b. The latch holding protrusion 30 protrudes in the direction (downward in FIG. 3(a)) opposite to the base housing 25 in the plate thickness direction. The latch holding protrusion 30 is shaped as a substantially trapezoidal post according to embossing (half blanking).

Further, a pawl 32 formed of a plate material is rotationally coupled with the base member 23 by a pawl bushing 31 mounted on the boss 25c. That is, as shown in FIG. 3 (b), the pawl bushing 31 has a substantially cylindrical support portion 31a, which is press-fit into the boss 25c and fixed into the fixing hole 24c at the tip end thereof. Also, the pawl bushing 31 has a flange 31b that extends outward in the radial direction from the proximal end of the support portion 31a positioned apart from the base plate 24. In contrast, a circular through hole 32a with an inner diameter the same as the outer diameter of the support portion 31a is formed in the pawl 32. The pawl 32 is rotationally supported around the support portion 31a to be inserted into the through hole 32a in the state where the movement thereof in the axial direction is limited between a distal end surface of the boss 25c and the flange 31b. The pawl 32 is arranged to correspond with the latch 27 in the axial direction. The plate thickness of the pawl 32 is set substantially the same as that of the latch 27.

As shown in FIGS. 1 and 2, the pawl 32 extends upward of the boss 25c substantially along the base grooves 24a and 25a. A circular coupling hole 32b is formed in the distal end portion of the pawl 32. An end portion of the control lever 22 is coupled to the coupling hole 32b via a snap 34. Further, the pawl 32 has a step 32c formed in an intermediate portion in the longitudinal direction. The step 32c faces the latch 27 in a circumferential direction. The width of the distal end portion of the pawl 32 via the step 32c is set smaller than the width of the proximal end portion thereof. A first pawl engaging surface 32d is formed on a proximal surface across the step 32c (surface in which the through hole 32a is positioned). A second pawl engaging surface 32e as a guide surface is formed on a distal surface across the step 32c (surface in which the coupling hole 32b is positioned).

Figure 4A:
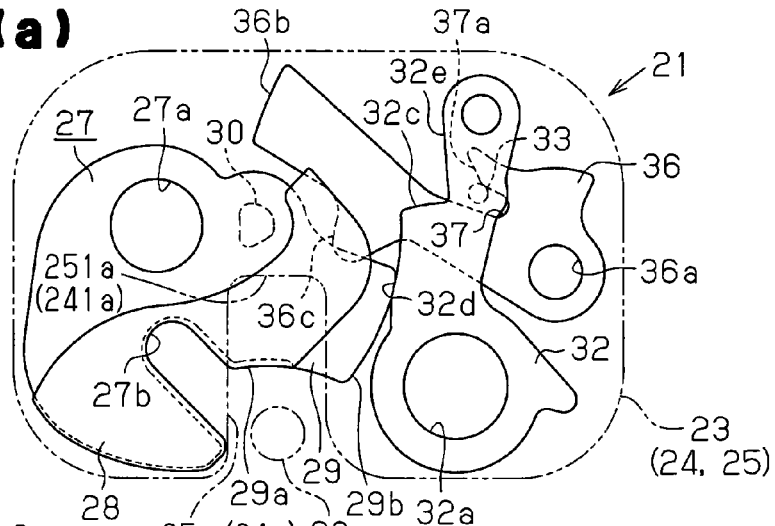
FIGS. 4(a) to 4(c) are explanatory views illustrating operations at the time of locking.
Figure 4B:
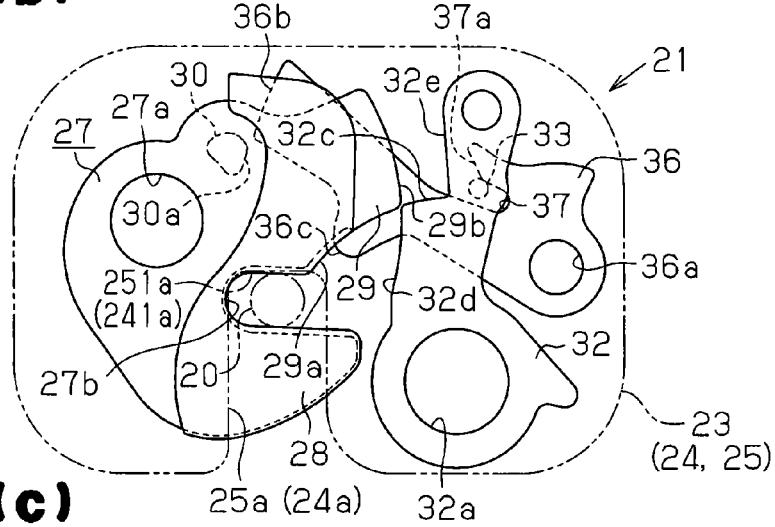

The step 32c is shaped as a substantially arcuate surface about the through hole 32a as a center. As shown in FIG. 2, in the state where the first latch engaging surface 29a is in contact with or close to the step 32c, a central portion of the first latch engaging surface 29a forming the substantially arcuate surface, i.e., the central portion of the arc substantially corresponds to the through hole 32a. The first pawl engaging surface 32d is shaped as a substantially arcuate surface with a recessed central portion. As shown in FIGS. 4(a) and 4(b), in the rotation range in which the first pawl engaging surface 32d slides on the second latch engaging surface 29b, a central portion of the first pawl engaging surface 32d forming the substantially arcuate surface, i.e., the central portion of the arc substantially corresponds to the through hole 27a. The second pawl engaging surface 32e extends substantially in the radial direction about the through hole 32a as a center. A pin-shaped pawl engaging protrusion 33 as an engaging protrusion is formed on the pawl 32 adjacent to the step 32c in a circumferential direction by embossing, for example, such that the pawl engaging protrusion 33 protrudes toward the base housing 25 in the plate thickness direction.

Figure 3B:
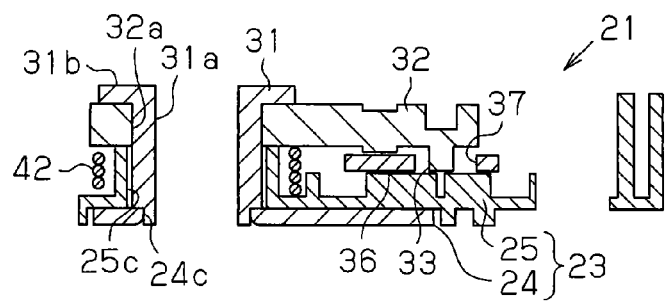
FIG. 3(b) is a cross-sectional view taken along line 3B-3B of FIG. 2.

As shown in FIG. 3(a), a latch spring 41 formed of a torsion coil spring is wound around the boss 25b. One end of the latch spring 41 is held by the spring holding portion 25e, while the other end is held by the latch 27. The latch spring 41 urges the latch 27 to rotate the latch 27 clockwise in FIG. 2. Also, as shown in FIG. 3(b), a pawl spring 42 formed of a torsion coil spring is wound around the boss 25c. One end of the pawl spring 42 is held by the spring holding portion 25f, while the other end is held by the pawl 32. The pawl spring 42 urges the pawl 32 to rotate the pawl 32 counterclockwise in FIG. 2.

As shown in FIG. 4(a), the latch 27, which is urged by the latch spring 41, is arranged at a predetermined rotation position (hereinafter, referred to as "an unlocked position") by allowing a surface thereof facing an inner wall surface of the base housing 25 to contact the inner wall surface according to the clockwise rotation shown in the drawing. In contrast, the pawl 32, which is urged by the pawl spring 42, is arranged at a rotation position (hereinafter, referred to as "an allowable position") at which the first pawl engaging surface 32d contacts the second latch engaging surface 29b. At this time, the first latch engaging surface 29a is arranged across the base grooves 24a and 25a. Accordingly, when the striker 20 is inserted into the base grooves 24a and 25a in the above mentioned manner, the first latch engaging surface 29a of the latch 27 is pressed against the striker 20. Thereby, the latch 27 slides the second latch engaging surface 29b on the first pawl engaging surface 32d, and rotates counterclockwise as viewed in the drawing against the urging force of the latch spring 41. According to this, the striker 20, which is inserted into the base grooves 24a and 25a, fits into the latch groove 27b via the first latch engaging surface 29a. In contrast, the pawl 32 permits the rotation of the latch 27 without swinging about the through hole 32a (pawl bushing 31), i.e., held at the allowable position.

When the latch 27, which is pressed against the striker 20, further rotates from the state (immediately before the locked state) shown in FIG. 4 (b), in which the second latch engaging surface 29b has reached a terminal end of the first pawl engaging surface 32d, the second latch engaging surface 29b releases the first pawl engaging surface 32d. Thereby, the pawl 32 is urged by the pawl spring 42 to slide the step 32c on the first latch engaging surface 29a, and rotates counterclockwise. As shown in FIG. 4 (c), the second pawl engaging surface 32e contacts the second latch engaging surface 29b. At this time, the step 32c is arranged on the rotation track of the second engaging portion 29 (first latch engaging surface 29a) in the clockwise direction so that the pawl 32 limits the rotation of the latch 27 in the rotation direction (i.e., the direction toward the unlocked position). In contrast, the latch 27 restrains the striker 20, which has fit into the latch groove 27b between the latch 27 and the base grooves 24a and 25a in the state where the first engaging portion 28 crosses the base grooves 24a and 25a. At this time, the rotation position of the latch 27 is referred to as the "locked position."

Figure 4C:
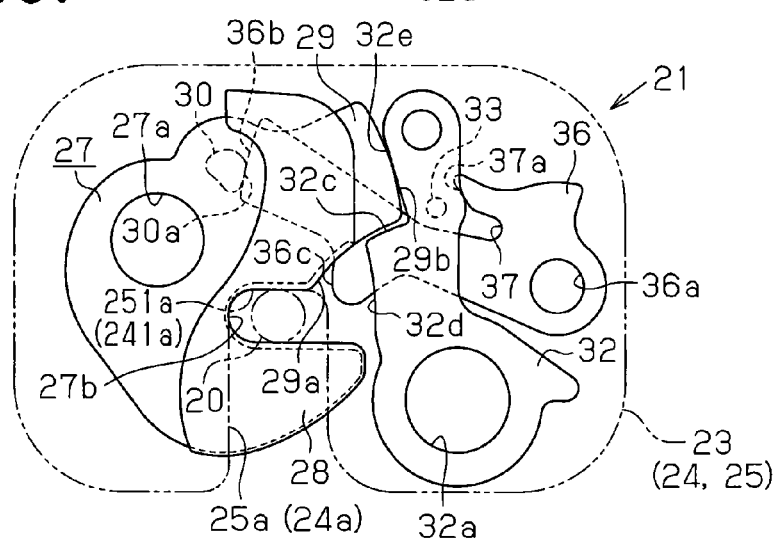

The rotating position of the pawl 32 shown in FIG. 4(c) at which the second latch engaging surface 29b contacts the second pawl engaging surface 32e is referred to as "a holding position." That is, when the pawl 32 is at the allowable position, the latch 27 is allowed to rotate between the unlocked position and the locked position. Also, when the pawl 32 is at the holding position at the locked position, the rotation of the latch 27 in the direction toward the unlocked position is limited. At this time, the second pawl engaging surface 32e, which contacts the second latch engaging surface 29b, is formed to allow the latch 27 to rotate without swinging the pawl 32. When the latch 27 is at the locked position, a surface of the latch holding protrusion 30 facing the boss 25d forms a latch engaging surface 30a shaped as an arcuate surface about the boss 25d as a center.

As shown in FIGS. 1 and 2, a cam member 36 formed of a plate material is rotationally coupled with the base member 23 by a cam pin 35 mounted on the boss 25d. That is, as shown in FIG. 3(a), the cam pin 35 has a substantially cylindrical support portion 35a, which is press-fit into the boss 25d and fixed into the fixing hole 24d at the tip end thereof. Also, the cam pin 35 has a flange 35b that extends outward in the radial direction at an intermediate portion of the support portion 35a in the longitudinal direction. In contrast, a circular through hole 36a with an inner diameter the same as the outer diameter of the support portion 35a is formed in the cam member 36. The cam member 36 is rotationally supported around the support portion 35a to be inserted into the through hole 36a in the state where the movement thereof in the axial direction is limited between a distal end surface of the boss 25d and the flange 35b. The cam member 36 is arranged at a position closer to the base plate 24 than the latch 27 in the axial direction. That is, the cam member 36 and the latch 27 are arranged in planes, which are different from each other and perpendicular to the direction of a rotation shaft of the cam member 36. The plate thickness of the cam member 36 is set sufficiently smaller than that of the latch 27.

The cam member 36 extends upward and leftward from the cam pin 35 and is located above the base grooves 24a and 25a as viewed in FIG. 2. A distal end surface of the cam member 36 forms a slanted holding surface 36b with a radial distance with the cam pin 35 (boss 25d) as a center, which is progressively increased in the clockwise direction. Also, the cam member 36 has a substantially U-shaped cam groove 37 as an engaging recess formed to be recessed toward the cam pin 35 above the intermediate portion of the cam member 36 in the longitudinal direction. The cam groove 37 is shaped to conform to the rotation track of the pawl engaging protrusion 33 about the pawl bushing 31 (through hole 32a) of the pawl 32 as a center at the allowable position. An opening end of the upper portion of the cam groove 37 forms a guide 37a that is inclined to extend and open upward. Further, the cam member 36 has a position determining portion 36c that protrudes in the transverse direction from a lower part of the intermediate portion in the longitudinal direction of the cam member 36.

A cam spring 43 formed of a torsion coil spring is wound around a tip end of the support portion 35a further apart from the base plate 24 than the flange 35b. One end of the cam spring 43 is held by the spring holding portion 25g, and the other end is held by the cam member 36. The cam spring 43 urges the cam member 36 to rotate the cam member 36 counterclockwise as viewed in FIG. 2.

In the state shown in FIGS. 4(a) and 4(b), where the second latch engaging surface 29b of the latch 27 slides on the first pawl engaging surface 32d of the pawl 32, the cam member 36 is held with respect to the pawl 32 by fitting the pawl engaging protrusion 33 of the pawl 32 into the cam groove 37 at the allowable position. At this time, the holding surface 36b of the cam member 36 opens the rotation track of the latch holding protrusion 30. In the state shown in FIG. 4(c), where the second latch engaging surface 29b of the latch 27 at the locked position slides on the second pawl engaging surface 32e, the pawl engaging protrusion 33 of the pawl 32 at the holding position is disengaged from the cam groove 37 so that the cam member 36 is urged by the cam spring 43 to be rotated counterclockwise. At this time, the slanted holding surface 36b with a progressively increasing radial distance in the above described embodiment is pressed against the latch engaging surface 30a of the latch holding protrusion 30 of the latch 27 at the locked position. Accordingly, the latch 27 is further rotated (urged) counterclockwise, i.e., the direction from the unlocked position to the locked position until the striker 20, which has been fitted into the latch groove 27b, contacts the bottom surfaces 241a and 251a of the base grooves 24a and 25a. In the present embodiment, a rotation shaft (pawl bushing 31) of the pawl 32 and a rotation shaft (cam pin 35) of the cam member 36 are arranged at positions different from each other. Thereby, a difference is made between the distance from the axis of the rotation shaft of the pawl 32 to the pawl engaging protrusion 33 and the distance from the axis of the rotation shaft of the cam member 36 to the pawl engaging protrusion 33. Accordingly, the timing of engaging and disengaging between the pawl 32 and the cam member 36 is arbitrarily adjusted by the difference between the distances.

Figure 5A:
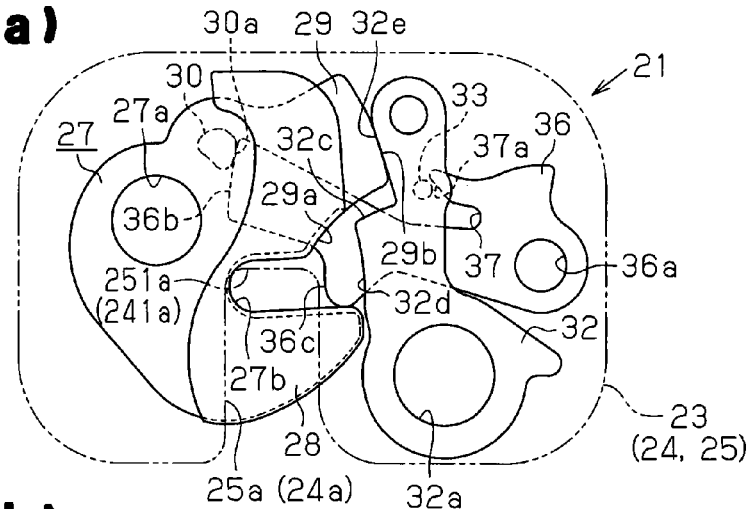
FIGS. 5(a) to 5(c) are explanatory views illustrating operations at the time of releasing the lock.

As shown in FIG. 5(a), the rotation of the cam member 36 accompanied by pressing of the latch 27 by the cam member 36 is allowed until the terminal end of the holding surface 36b reaches the latch holding protrusion 30 (maximally urged state). That is, even if the rotation position of the latch 27 at which the striker 20 contacts the bottom surfaces 241a and 251a of the base grooves 24a and 25a varies due to variation of assembling or across the ages, the backlash of the striker 20 is reduced as long as the cam member 36 is within the rotation range. Although the first latch engaging surface 29a becomes apart from the step 32c of the pawl 32 in the circumferential direction about the through hole 27a as a center according to the above described rotation of the latch 27 by the amount of rotation of the latch 27, the step 32c is still arranged on the rotation track of the first latch engaging surface 29a. When the latch 27 rotates as described above, the second latch engaging surface 29b slides on the second pawl engaging surface 32e to reduce the swinging of the pawl 32 from the holding position.

Figure 5B:
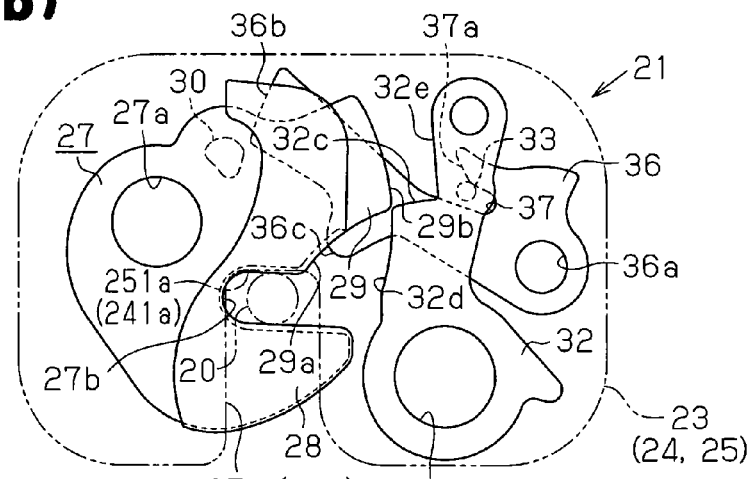

Next, when the pawl 32 rotates clockwise against the urging force of the pawl spring 42 according to the operation of the above described control lever 22 (unlocking operation), the cam member 36 with the guide 37a pressed by the pawl engaging protrusion 33 rotates clockwise about the through hole 36a as a center, while disengaging the holding surface 36b from the latch holding protrusion 30. According to this, when the holding surface 36b is completely disengaged from the latch holding protrusion 30, the latch 27 is urged by the latch spring 41 to be rotated clockwise until the first latch engaging surface 29a contacts the step 32c. When the pawl 32 further rotates clockwise successively, the pawl 32 slides the step 32c on the first latch engaging surface 29a, and, as shown in FIG. 5(b), reaches the rotation position (hereinafter, referred to as the "unlocked position"), at which the step 32c reaches the terminal end of the first latch engaging surface 29a (connection position with the second latch engaging surface 29b). The unlocked position of the pawl 32 corresponds to the allowable position. At this time, the pawl engaging protrusion 33 of the pawl 32 starts fitting into the cam groove 37 of the cam member 36.

When the pawl 32 further rotates clockwise, the latch 27 with the first latch engaging surface 29a disengaged from the step 32c is urged by the latch spring 41 to be rotated clockwise so that, as shown in FIG. 5(a), the latch 27 returns to the unlocked position. At this time, the cam member 36 with the cam groove 37, into which the pawl engaging protrusion 33 of the pawl 32 has inserted, is rotated clockwise in conjunction with the rotation of the pawl 32. That is, the cam member 36 is held by the pawl 32 by fitting the pawl engaging protrusion 33 into the cam groove 37 within the range shown in FIGS. 5(b) and 5(c), in which the pawl 32 is substantially maximally rotated in the clockwise direction from the unlocked position (full stroke).

Figure 5C:
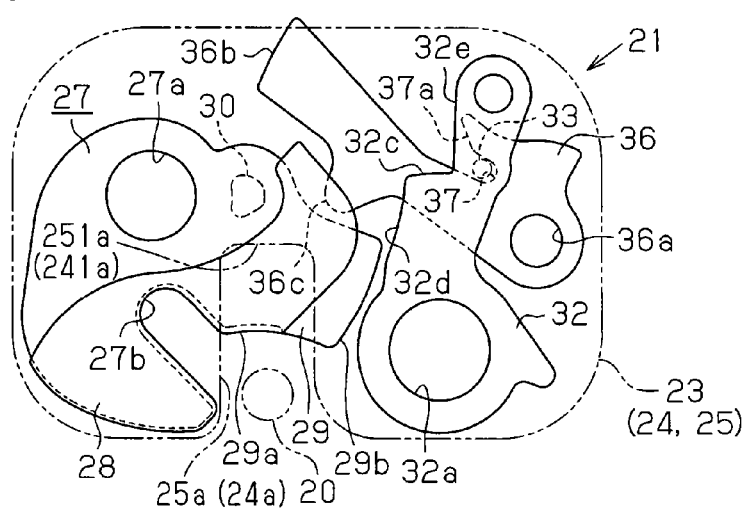

As shown in FIGS. 4 and 5, the cam member 36 is set such that at least a part of the cam member 36 always overlaps with the latch 27 in the axial direction irrespective of the rotation position of the latch 27. In particular, as shown in FIG. 5(c), even if the pawl 32 is at the maximally rotated position (full stroke) in the clockwise direction so that the cam member 36 is apart from the latch 27 substantially by the maximum distance, the position determining portion 36c is formed to overlap with the latch 27 in the axial direction. Thereby, when the latch 27 rotates, shifting of the cam member 36 with respect to the latch 27 in the axial direction is limited.

Next, the operation of the present embodiment will be described.

First, as shown in FIG. 4(a), it is assumed that the latch 27 is at the unlocked position, while the pawl 32 is at the allowable position. At this time, the pawl engaging protrusion 33 fits into the cam groove 37 so that the cam member 36 is held by the pawl 32 at the rotation position where the moving track of the latch 27 is opened. In this state, when the striker 20 is inserted into the base grooves 24a and 25a accompanying raising of the seat back 12 backward, the latch 27, which is pressed by the striker 20, rotates counterclockwise against the urging force of the latch spring 41. Then, the striker 20, which has been inserted into the base grooves 24a and 25a, fits into the latch groove 27b. In this stage, the pawl 32 is still at the allowable position, where the rotation of the latch 27 is permitted, and the cam member 36, which is held by the pawl 32, is still in the state where the cam member 36 opens the moving track of the latch 27.

When the latch 27, which is pressed by the striker 20, further rotates from the state immediately before locking shown in FIG. 4 (b), the first pawl engaging surface 32d is disengaged from the latch 27 so that the pawl 32 is urged by the pawl spring 42 to be rotated counterclockwise to be moved to the holding position shown in FIG. 4(c). Thereby, the rotation of the latch 27 in the direction toward the unlocked position is limited. At this time, the latch 27 restrains the striker 20, which has fit into the latch groove 27b, between the latch 27 and the base grooves 24a and 25a. In contrast, the pawl engaging protrusion 33 of the pawl 32 is disengaged from the cam groove 37 so that the cam member 36 is urged by the cam spring 43 to be rotated counterclockwise. The cam member 36 further rotates the latch 27 counterclockwise by pressing the holding surface 36b against the latch holding protrusion 30 until the striker 20, which has fit into the latch groove 27b, contacts the bottom surfaces 241a and 251a of the base grooves 24a and 25a. This limits the backlash of the striker 20.

In this state, even if the latch 27 is pressed by the striker 20, which acts to escape the base grooves 24a and 25a, the rotation of the latch 27 clockwise, i.e., the direction from the locked position to the unlocked position is limited by the slanted holding surface 36b, which is pressed against the latch holding protrusion 30 if the rotation force is slight. Even if the pressed state between the holding surface 36b and the latch holding protrusion 30 is released by the buckling of the cam member 36 due to application of extreme external force, the step 32c of the pawl 32 at the holding position faces the first latch engaging surface 29a of the latch 27 so that the clockwise rotation of the latch 27 is still limited.

Next, as shown in FIGS. 4(c) and 5(a), it is assumed that the latch 27 is at the locked position, and the pawl 32 is at the holding position. In this state (locked state), when the pawl 32 rotates clockwise against the urging force of the pawl spring 42 according to the operation of the control lever 22, the cam member 36 with the guide 37a pressed by the pawl engaging protrusion 33 rotates clockwise, while disengaging the holding surface 36b from the latch holding protrusion 30. Thereby, the latch holding protrusion 30 of the latch 27 is released from the holding surface 36b of the cam member 36.

At the unlocked position shown in FIG. 5(b), the step 32c reaches the terminal end of the first latch engaging surface 29a, and the pawl engaging protrusion 33 of the pawl 32 starts fitting into the cam groove 37 of the cam member 36. In this state, when the pawl 32 further rotates, the latch 27 with the first latch engaging surface 29a, which has been disengaged from the step 32c, is urged by the latch spring 41 to be rotated clockwise so that, as shown in FIG. 5(c), the latch 27 returns to the unlocked position. At this time, the cam member 36 held by the pawl 32 in the cam groove 37 rotates clockwise in conjunction with the rotation of the pawl 32. Then, when the operation of the control lever 22 is cancelled, as shown in FIG. 4(a), the pawl 32 is urged by the pawl spring 42 to be rotated counterclockwise until the first pawl engaging surface 32d contacts the second latch engaging surface 29b so that the pawl 32 returns to the allowable position.

The control lever 22, which is connected to the pawl 32 via the snap 34, is arranged at positions different from each other in accordance with the allowable position and the holding position of the pawl 32.

The above described embodiment has the following advantages.

(1) When the pawl 32 is at the allowable position, the latch 27 is allowed to rotate between the locked position and the unlocked position. At this time, the cam member 36 allows the rotation of the latch 27 in the state where the cam member 36 is held by the pawl 32 by engaging the pawl engaging protrusion 33 with the cam groove 37. When the latch 27 is in the locked position, the pawl 32 rotates from the allowable position to the holding position to hold the rotation of the latch 27 to the unlocked position. At this time, the pawl engaging protrusion 33 is disengaged from the cam groove 37 so that the cam member 36 engages with the latch 27 without being restrained by the pawl 32 to rotate the latch 27 such that the striker 20 contacts the bottom surfaces 241a and 251a of the base grooves 24a and 25a. This limits the backlash of the striker 20, which is restrained by the latch 27. As described above, the rotations of the pawl 32 and the cam member 36 when the latch 27 is at the locked position are independent from each other so that the ranges of the rotations may be set independently. Accordingly, the rotation range of the pawl 32 may be preferably set without being limited by the rotation range of the cam member 36. For example, the amount of unlocking operation of the control lever 22 correlated with the amount of rotation is reduced so that the manipulability and the appearance are improved. The rotation ranges of the pawl 32 and the cam member 36 are limited to minimum necessary for a function of each so that the degree of freedom of arranging each of the pawl 32 and the cam member 36 is improved. Further, the pawl engaging protrusion 33 and the cam groove 37 associated with engaging and disengaging of the pawl 32 and the cam member 36 are integrally formed so that the increase of the number of components is limited. Accordingly, the likelihood of assembling error due to the increase of the number of components is reduced so that the number of steps of assembling is reduced.

(2) The control lever 22 is arranged at positions different from each other in accordance with the allowable position and the holding position of the pawl 32. Accordingly, the position of the control lever 22 is visually confirmed so that the restrained state or the released state of the striker 20 by the latch 27 is confirmed. This improves the manipulability. Thereby, for example, the striker 20 is prevented from being left in the imperfect restrained state.

(3) Even if the latch 27 is rotated when the pawl 32 is at the holding position so that the striker 20 contacts the bottom surfaces 241a and 251a of the base grooves 24a and 25a by the cam member 36, the rotation is allowed by the second pawl engaging surface 32e so that the swinging of the pawl from the holding position is limited. The holding of the rotation of the latch 27 at the locked position to the unlocked position by the pawl 32 is performed in the stable orientation irrespective of the amount of rotation of the latch 27.

(4) A part of the cam member 36 is layered on the latch 27 in the axial direction within the entire range in which the latch 27 can rotate. Accordingly, for example, when the latch 27 rotates, the likelihood of disabling the cam member 36 due to shifting of the cam member 36 with respect to the latch 27 in the axial direction is limited.

(5) In the locked state, for example, even if the latch 27 is pressed by the striker 20, the rotation of the latch 27 in the direction to the unlocked position is limited by the slanted holding surface 36b, which is pressed against the latch holding protrusion 30.

Also, even if the pressed state between the holding surface 36b and the latch holding protrusion 30 is released by the buckling of the cam member 36 due to application of extreme external force, the step 32c of the pawl 32 at the holding position faces the first latch engaging surface 29a of the latch 27 so that the rotation of the latch 27 in the direction to the unlocked position is limited. In particular, the radial distance from the axis of the rotation shaft (pawl bushing 31) of the pawl 32 to the step 32c is set shorter than the radial distance from the axis of the rotation shaft (cam pin 35) of the cam member 36 to the holding surface 36b so that the strength of the pawl 32 with respect to the external force is sufficiently ensured.

(6) By setting the engagement relationship between the pawl engaging protrusion 33 and the cam groove 37, the rotation timing of the pawl 32 from the allowable position to the holding position and the operation timing (delay time) of the cam member 36 are adjusted so that the operations of the pawl 32 and the cam member 36 are more stabled.

The above described embodiments may be modified as follows.

The latch engaging surface 30a may be shaped as a plane that is substantially perpendicular to the radial direction about the boss 25d as a center at the locked position of the latch 27.

Regarding the latch 27 and the cam member 36, the arrangement relationship between the latch holding protrusion 30 and the holding surface 36b may be inversed. That is, a protrusion that protrudes in the plate thickness direction of the cam member 36 may be formed on the cam member 36, and a holding surface that holds the protrusion may be formed on the end surface of the latch 27, accordingly. The protrusion may be pressed against the holding surface so that the latch 27 may be rotated such that the striker 20 contacts the bottom surfaces 241a and 251a of the base grooves 24a and 25a. In this case, the radial distance from the axis of the rotation shaft (pawl bushing 31) of the pawl 32 to the step 32c is set shorter than the radial distance from the axis of the rotation shaft (latch bushing 26) of the latch 27 to the holding surface.

The cam groove 37 as an engaging recess may be a cam hole into which the pawl engaging protrusion 33 is inserted with allowance, or a cam hole with which the pawl engaging protrusion 33 engages.

Regarding the pawl 32 and the cam member 36, the arrangement relationship between the pawl engaging protrusion 33 (engaging protrusion) and the cam groove 37 (engaging recess) may be inversed. That is, a groove (engaging recess) may be formed in the pawl 32, and an engaging protrusion may be formed in the cam member 36.

Regarding the vehicle body 13 (fixing member) and the seat back 12 (moveable member), the arrangement relationship between the striker 20 and the lock body 21 (base member 23) may be inversed. That is, the lock body 21 (base member 23) may be fixed to the vehicle body 13 (fixing member), and the striker 20 may be attached to the seat back 12 (moveable member). That is, the lock body 21 (base member 23) may only be configured such that it is fixed to one of the fixing member or the moveable member. The striker 20 may be fixed to the other one of the fixing member and the moveable member.

The present invention may be applied to devices such as a device (slide device) that adjusts the position of the seat cushion 11 in the front-back direction, a device (lift device) that adjusts a position in the vertical direction, a length adjusting device for the seat cushion 11, and an ottoman device. Alternatively, the present invention may be applied to an appropriate device that adjusts the position of the moveable member to be mounted on the vehicle. Specifically, the present invention may be applied to devices such as a tilt adjusting device for a steering wheel, and a door lock device.

The invention claimed is:

1. A vehicle lock device comprising:
   a base member configured to be fixed to one of a fixing member and a moveable member, the base member having a base groove into which a striker that is connected to the other one of the fixed member and the moveable member is inserted, the base groove including a bottom surface;
   a latch having a latch groove, wherein the latch groove is capable of being engaged with and disengaged from the striker, the latch is rotationally coupled to the base member, and the latch can rotate between a locked position, in which the latch restrains the striker while the striker is between the latch and the base groove, and an unlocked position, in which the latch releases the striker;
   a pawl, which is rotationally coupled to the base member by a first rotation shaft and is rotational between an allowable position and a holding position, wherein, in the allowable position, the pawl allows the latch to rotate between the locked position and the unlocked position, and at the holding position, the pawl prevents rotation of the latch from the locked position to the unlocked position, and the pawl rotates from the holding position to the allowable position according to an unlocking operation;
   a cam member, which is rotationally coupled to the base member by a second rotation shaft that is different from the first rotation shaft of the pawl, wherein the cam member allows the latch to rotate between the locked position and the unlocked position and is engaged with the latch at the locked position to rotate the latch such that the striker contacts the bottom surface of the base groove;
   an engaging protrusion integrally formed on the pawl;
   an engaging recess integrally formed in the cam member, wherein the engaging recess is engaged with the engaging protrusion to hold the cam member when the pawl is located the allowable position, and the engaging recess is disengaged from the engaging protrusion to release the cam member from the pawl when the pawl rotates between the allowable position and the holding position, and the engaging recess is shaped to extend in a rotation direction of the pawl when the pawl is located at the allowable position;
   a holding protrusion formed on at least one of the latch and the cam member; and
   a holding surface formed on the other one of the latch and the cam member,
   wherein the holding protrusion and the holding surface are pressed against each other when the latch is at the locked position so that the cam member rotates the latch such that the striker contacts the bottom surface of the base groove.

2. The vehicle lock device according to claim 1, further comprising:
   a control member, which is coupled to the pawl and performs the unlocking operation, wherein positions of the control member that correspond to the allowable position and the holding position of the pawl are different from each other.

3. The vehicle lock device according to claim 1, wherein a guide surface is formed on the pawl, and the guide surface slides on the latch when the pawl is at the locked position to allow the latch to be rotated by the cam member.

4. The vehicle lock device according to claim 1, wherein
the latch and the cam member are located on different planes that are perpendicular to an axial direction of the second rotation shaft, and
a part of the cam member overlaps with the latch in the axial direction over the entire range of rotation of the latch.

5. The vehicle lock device according claim 1, wherein a distance between an axis of the first rotation shaft of the pawl and the engaging protrusion is different from a distance between an axis of the second rotation shaft of the cam member and the engaging protrusion.

6. The vehicle lock device according to claim 1, further comprising: a latch engaging surface formed on the latch; and a step formed on the pawl, wherein the step contacts the latch engaging surface at the locked position, and the step is arranged on a rotation track of the latch in the unlocking direction.

7. The vehicle lock device according to claim 6, wherein a radial distance from an axis of the first rotation shaft of the pawl to the step is shorter than a radial distance from the latch on which the holding surface is formed or an axis of the rotation shaft of the cam member to the holding surface.

\* \* \* \* \*